United States Patent
Sargent et al.

(10) Patent No.: US 9,160,568 B2
(45) Date of Patent: Oct. 13, 2015

(54) SYSTEMS AND METHODS FOR CREATING AND UPDATING REPUTATION RECORDS

(75) Inventors: James Sargent, Purcellville, VA (US); Sylvia Margot Romary, Oakton, VA (US); Jean-Jacques Moortgat, Fairfax, VA (US); Lachlan Maxwell, Ashburn, VA (US); Michael Adkins, Leesburg, VA (US); Ding Xiao, Sterling, VA (US)

(73) Assignee: AOL Inc., Dulles, VA (US)

( * ) Notice: Subject to any disclaimer, the term of this patent is extended or adjusted under 35 U.S.C. 154(b) by 94 days.

(21) Appl. No.: 13/620,409

(22) Filed: Sep. 14, 2012

(65) Prior Publication Data

US 2013/0018972 A1 Jan. 17, 2013

Related U.S. Application Data (63) Continuation of application No. 12/570,998, filed on Sep. 30, 2009, now Pat. No. 8,321,516.

(60) Provisional application No. 61/136,753, filed on Sep. 30, 2008.

(51) Int. Cl.
G06F 15/16 (2006.01)
H04L 12/58 (2006.01)
G06Q 10/10 (2012.01)

(52) U.S. Cl.
CPC .............. *H04L 12/585* (2013.01); *G06Q 10/10* (2013.01); *H04L 51/12* (2013.01)

(58) Field of Classification Search
CPC ..... H04L 51/12; H04L 12/58; H04L 63/0245; H04L 63/0227

USPC .................................................. 709/203–206
See application file for complete search history.

(56) References Cited

U.S. PATENT DOCUMENTS

| | | | |
|---|---|---|---|
| 6,393,465 B2 * | 5/2002 | Leeds | 709/207 |
| 7,206,814 B2 | 4/2007 | Kirsch | |
| 7,373,385 B2 * | 5/2008 | Prakash | 709/206 |

(Continued)

OTHER PUBLICATIONS

Zheleva et al., "Trusting Spam Reporters: A Reporter Based Reputation System for Email Filtering," *ACM Transactions on Information Systems*, vol. 27, No. 1, Dec. 2008, pp. 1-37.

(Continued)

*Primary Examiner* — Minh-Chau Nguyen
(74) *Attorney, Agent, or Firm* — Finnegan, Henderson, Farabow, Garrett & Dunner, L.L.P.

(57) ABSTRACT

According to one aspect of the present disclosure, a computer-implemented method is provided for generating a reputation record and filtering electronic messages, each reputation record including a reputation score and a reputation key. The method includes receiving at least one incoming event notification, including a reputation key; determining, based on the reputation key, whether a corresponding reputation record exists; creating a new reputation record if the corresponding reputation record does not exist; determining a trust determination function based on the incoming event notification; calculating a reputation score based on the determined trust determination function, the incoming event notification, and an attribute associated with the reputation key; storing the calculated reputation score along with the reputation key in either the new reputation record or the corresponding reputation record; and filtering one or more electronic messages based on the calculated reputation score.

20 Claims, 7 Drawing Sheets

(56) References Cited

U.S. PATENT DOCUMENTS

| | | |
|---|---|---|
| 2005/0080856 A1* | 4/2005 | Kirsch .......................... 709/206 |
| 2005/0204012 A1 | 9/2005 | Campbell |
| 2007/0192855 A1* | 8/2007 | Hulten et al. ................... 726/22 |
| 2008/0005064 A1* | 1/2008 | Sarukkai ........................... 707/3 |
| 2008/0104180 A1 | 5/2008 | Gabe |
| 2008/0250106 A1* | 10/2008 | Rugg et al. .................... 709/206 |
| 2009/0013375 A1* | 1/2009 | MacIntosh et al. ............... 726/1 |
| 2009/0037469 A1 | 2/2009 | Kirsch |
| 2009/0037546 A1 | 2/2009 | Kirsch |

OTHER PUBLICATIONS http://www.maawg.org/about/publishedDocuments/MAAWG_Senders_Reputation_Concepts.pdf, "Messaging Anti-Abuse Working Group (MAAWG) Message Sender Reputation Concepts and Common Practices," MAAWG, downloaded on Jan. 20, 2010 (10 pages).

* cited by examiner

| REPUTATION KEY ("keyValue") (e.g., member's GUID) | REPUTATION CATEGORY ("tagValue") (e.g., trust category or level) | REPUTATION SCORE ("dataValue") (e.g., trust score) | CONFIDENCE FACTOR ("data3Value") | TDF ID ("data2Value") |
|---|---|---|---|---|
| 5080864649 | trusted | .72 | .8 | 1 |
| 3126828906 | unknown_trust | .50 | .1 | 1 |
| 7389027424 | untrusted | .21 | .7 | 1 |
| 4653827925 | trusted | .67 | .4 | 1 |

FIG. 7

SYSTEMS AND METHODS FOR CREATING AND UPDATING REPUTATION RECORDS

RELATED APPLICATION(S)

This application is a continuation of U.S. application Ser. No. 12/570,998, filed on Sep. 30, 2009 now U.S. Pat. No. 8,321,516 (now allowed), which claims priority to U.S. Provisional Application No. 61/136,753, filed on Sep. 30, 2008, the disclosures of which are expressly incorporated herein by reference to their entireties.

TECHNICAL FIELD

The present disclosure relates generally to systems and methods for managing electronic communications and messages. More particularly, and without limitation, the present disclosure relates to systems and methods for creating and updating reputation records used in managing electronic communications and messages.

BACKGROUND

Email spam is a growing problem for the Internet community. Spam interferes with valid email, and it burdens both email users and email service providers (ESPs). Not only is it a source of annoyance, but it also adversely affects productivity and translates to significant monetary costs for the email industry (e.g., reduced bandwidth, increased storage requirements, and the cost of supporting filtering infrastructures). Also, for some categories of spam, such as phish scams, the financial costs for users may be even greater due to fraud and theft.

Generally, spam-filtering techniques can be divided into three broad categories: spam-filtering based on sender-based reputation, spam-filtering based on email-header analysis, and spam-filtering based on an analysis of message content. In the first category, a sender-based reputation framework, senders are classified as either "spammers" or "good senders," based on criteria such as the sender's identity, the sender's domain, or the sender's IP address. The second category, email-header spam filtering, is based on detecting forgery in the email header and distinguishing the forgery from malformatting and other legitimate explanations, such as those resulting from forwarding activity. The third category, analysis of message content, typically involves machine learning using a classifier for spam detection, using both batch-mode and online update models.

Content analysis using machine learning classification involves several disadvantages, including vulnerability to adversarial attacks, and difficulty in tuning and changing the classification functions. The diversity of messages within a spam campaign may be too low to effectively adjust the filtering function quickly enough. Another problem in automating spam classification is the lack of a consensus definition for spam. What some people consider spam may be considered solicited mail by others. Some email service providers ("ESPs") allow users to mark emails they consider spam and report them to their ESP, in so-called "TIS" (this is spam) reports. In some cases, users can also report opposite errors, i.e., when legitimate email is mistakenly classified as spam, by submitting so-called "TINS" (this is not spam) reports. However, because user reports rely upon personalized definitions of spam, the value of each individual's judgments may be questionable. For example, many TINS reports may be generated by spammers seeking to legitimize their own spam. Spammers may also submit TIS reports to identify legitimate mail as being spam, in an effort to confuse traditional spam filters. Therefore, traditional spam filtering systems and methods may not satisfactorily identify those entities whose spam reports should be trusted. As a result, traditional spam filtering techniques may fail to sufficiently reduce the costs that users and systems incur as a result of spamming.

The disclosed embodiments of the present disclosure are directed to overcoming one or more of the problems set forth above, by providing systems and methods for creating and updating reputation records and filtering electronic messages.

SUMMARY

In one exemplary embodiment, the present disclosure is directed to a computer-implemented method for creating and updating reputation records, each reputation record including a reputation score and a unique reputation key. The method includes receiving at least one incoming event notification, including an indexing reputation key; determining, based on the indexing reputation key, if a corresponding reputation record exists; creating, if the corresponding reputation record does not exist, a new reputation record including a default reputation score; storing, when the new reputation record is created, the default reputation score as the reputation score and the indexing reputation key as the unique reputation key; and updating the reputation score based on the at least one incoming event notification and a trust determination function.

In another exemplary embodiment, the present disclosure is directed to a computer-implemented method for calculating a reputation score and filtering electronic messages. The method includes receiving at least one incoming event notification, including an indexing reputation key; determining, based on the indexing reputation key and at least one event type, a trust determination function; calculating a reputation score based on the determined trust determination function; and filtering one or more electronic messages based on the calculated reputation score.

In another exemplary embodiment, the present disclosure is directed to a computer-implemented method for generating a reputation record and filtering electronic messages, each reputation record including a reputation score and a reputation key. The method includes receiving at least one incoming event notification, including a reputation key; determining, based on the reputation key, whether a corresponding reputation record exists; creating a new reputation record if the corresponding reputation record does not exist; determining a trust determination function based on the incoming event notification; calculating a reputation score based on the determined trust determination function, the incoming event notification, and an attribute associated with the reputation key; storing the calculated reputation score along with the reputation key in either the new reputation record or the corresponding reputation record; and filtering one or more electronic messages based on the calculated reputation score.

Additional objects and advantages will be set forth in part in the description which follows, and in part will be obvious from the description, or may be learned by practice of the embodiments of the invention. For example, the objects and advantages may be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

Consistent with embodiments of the invention, an email service provider ("ESP") or other facilitator of electronic communications may desire to filter or otherwise block certain communications that are identified as likely being spam based on a reputation of, or trust level associated with, the sender of the communication. For example, an ESP may monitor an electronic communications network through servers connected to the Internet and/or a plurality of email servers. The ESP may then calculate a reputation score associated with one or more senders of communications over the network, and then filter a senders communications if the sender's reputation is below a predetermined threshold. For example, the ESP may block the sender's email account or not deliver messages sent by the sender. Alternatively, or additionally, if the ESP provides messaging services to a recipient of the sender, the ESP may prevent the recipient from viewing messages sent from the sender, based on the sender's calculated reputation. In one embodiment, the ESP may perform all of the tasks of monitoring the network, calculating sender reputations, and/or filtering messaging based on the calculated reputations. In another embodiment, the ESP may share one or more of the tasks with another ESP, an Internet Service Provider ("ISP"), an advertiser, or any other third-party company configured to interact with the ESP and/or the electronic communications network.

Consistent with embodiments of the invention, the present disclosure relates to creating and updating a reputation record, including a trust level, as an attribute associated with one or more entities interacting with an electronic communication network, such as an email system. Essentially, it may be desirable to know who can be trusted and who cannot be trusted in the context of spam reporting in an email system. Those who cannot be trusted may include those that cannot be trusted due to known information about them, and those that cannot be trusted due to a lack of information about them. Thus, while an entity's trust level may be represented on a continuous scale, for purposes of using that information, a specific application may have the trust attribute divided into discrete categories or levels to make use of it. The number of such categories may be specific to the application, but in one embodiment, there may be three such categories: "trusted" for entities that have high reputations, "not trusted" for entities that have bad reputations, and "unknown trust" for entities that have no known reputation.

The presently disclosed systems and methods for performing reputation services may involve creating, storing, updating, and reporting an individual reputation value, or trust level, for each entity associated with a system. For purposes of the present disclosure, an "entity" may be a user account identified by a global user ID ("GUID"), an IP address, an internal domain, an external domain, or any other item for which a reputation level may be assigned. Moreover, for purposes of the present disclosure, the phrase "reputation key" may be used to define an entity-specific identifier, such as number, pin, or username, which may be assigned to each entity, for the purpose of identifying the entity with which a reputation value is associated. An "indexing reputation key" may be a particular instance of a reputation key, which may be temporarily assigned until updated with a reputation key which is identified as being unique to a particular entity. A reputation record may be any data file or text string, which includes a reputation key, reputation score, confidence factor, and trust determination function ID (TDF ID). For purposes of the present disclosure, information, such as event notifications, reputation-affecting events, attribute information, reputation queries, alerts, and/or reputation records, may be passed between servers and entities by any suitable messaging means, such as email, XML, or any other proprietary messaging protocol.

In certain embodiments of the present disclosure, reputation levels may then be used to, among other things: (I) determine whether a given user is spamming based on his reputation and behavior, and take appropriate action on the users account; (II) determine whether a spamming account is a compromised account versus one set up purely for spamming and then take appropriate action on the user's account; (III) improve spam detection and spam prevention through better bulk mailer scrubbing by using reputation levels of email recipients; (IV) improve identification of spam incorrectly delivered to the inbox and good mail incorrectly spam-foldered by using reports of trusted email recipients only, so that corrective measures can be put into place more quickly; and (V) improve spam detection by grouping users with similar reporting patterns in order to create group-centric spam filters.

Figure 1:
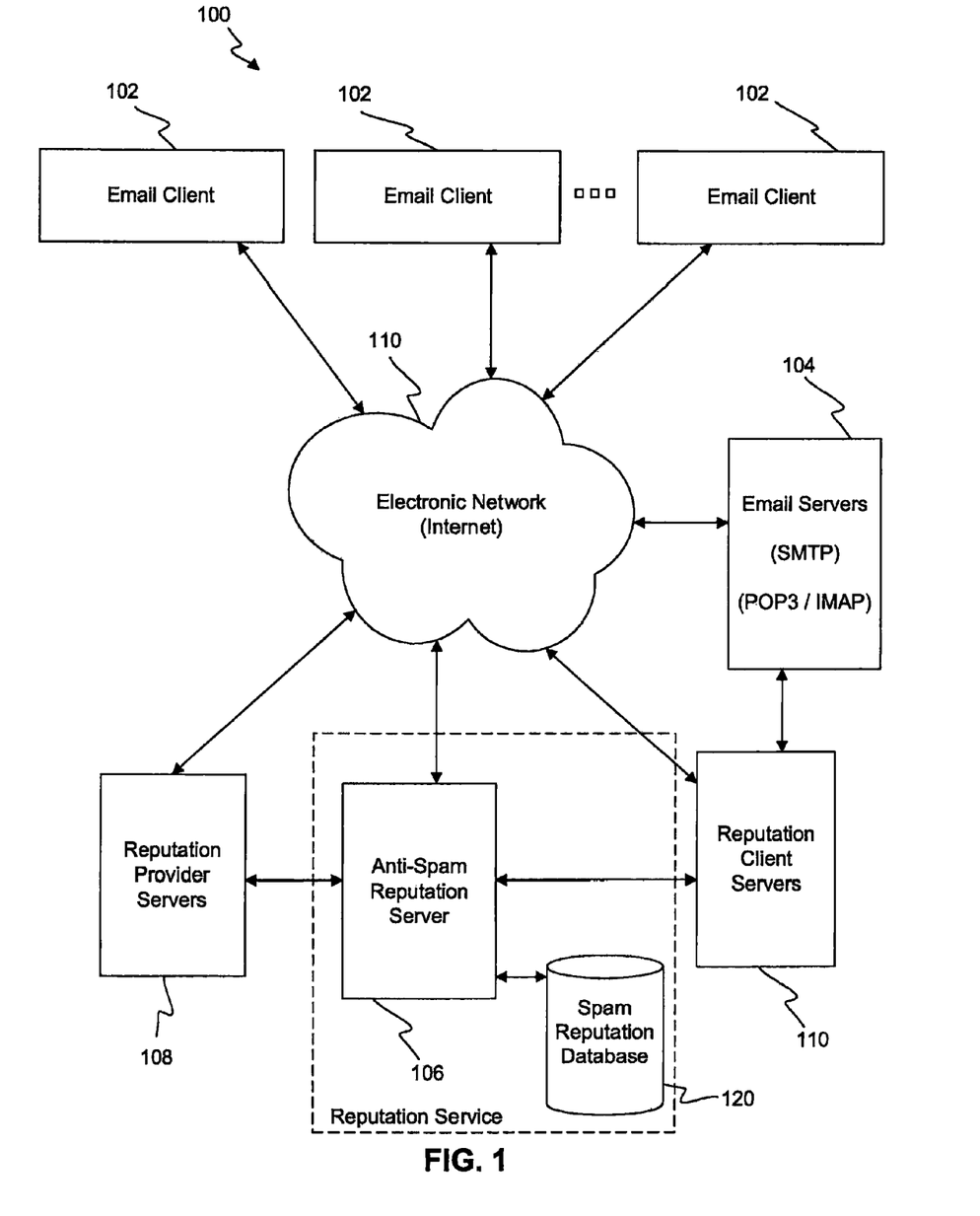
FIG. 1 is a block diagram of an exemplary electronic communication and messaging system, consistent with certain embodiments of the present disclosure.

FIG. 1 is a block diagram of an exemplary communication system 100. Communication system 100 may include an email and spam-filtering system, and may be configured to identify and process spam and/or spam campaigns using one or more of the embodiments disclosed herein. A spam campaign may be, for example, a group of highly similar electronic messages (e.g., electronic mail messages, Short Messaging System (SMS) messages, Multimedia Messaging System (MMS) messages, etc.). Communication system 100 may include any type of communication system, including, for example, a wired communication system, a wireless communication system, a local- or wide-area network, an Internet network, or any combination thereof.

As shown in FIG. 1, communication system 100 may include one or more email clients 102, a plurality of email servers 104, an anti-spam reputation server 106, a plurality of reputation provider servers 108, and a plurality of reputation client servers 110, all disposed in communication with an electronic network 110, such as the Internet. Communication system 100 may also include a spam reputation database 120 disposed in communication with anti-spam reputation server 106. Some of the email clients 102 may include valid Internet users who are individuals seeking to send and receive emails from known acquaintances for personal and/or professional purposes (i.e., "good senders"). Some of the email clients 102 may include "spammers," who are entities seeking to send large quantities of emails to known and unknown individuals for commercial or other purposes. Email clients 102 may each interact with email servers 104 through computers connected to the electronic network 110 (such as the Internet), or through mobile communications devices, such as mobile phones and personal digital assistants (PDAs).

In general, servers 104, 106, 108, and 110 may be configured to receive, collect, analyze, evaluate, report, display, and distribute data related to determining a reputation score and confidence factor associated with an entity, and passing and/or filtering of electronic messages based on the reputation score, using one or more software components or applications accordingly. For example, the servers may be configured to manage and track: electronic messages, reports from users, system activity, patterns of messaging, information regarding system software, and the like, associated with the management, tracking, and collection of electronic messages. The servers may also be configured to perform filtering of electronic messages and/or determine a level of confidence associated with a user report.

Figure 2:
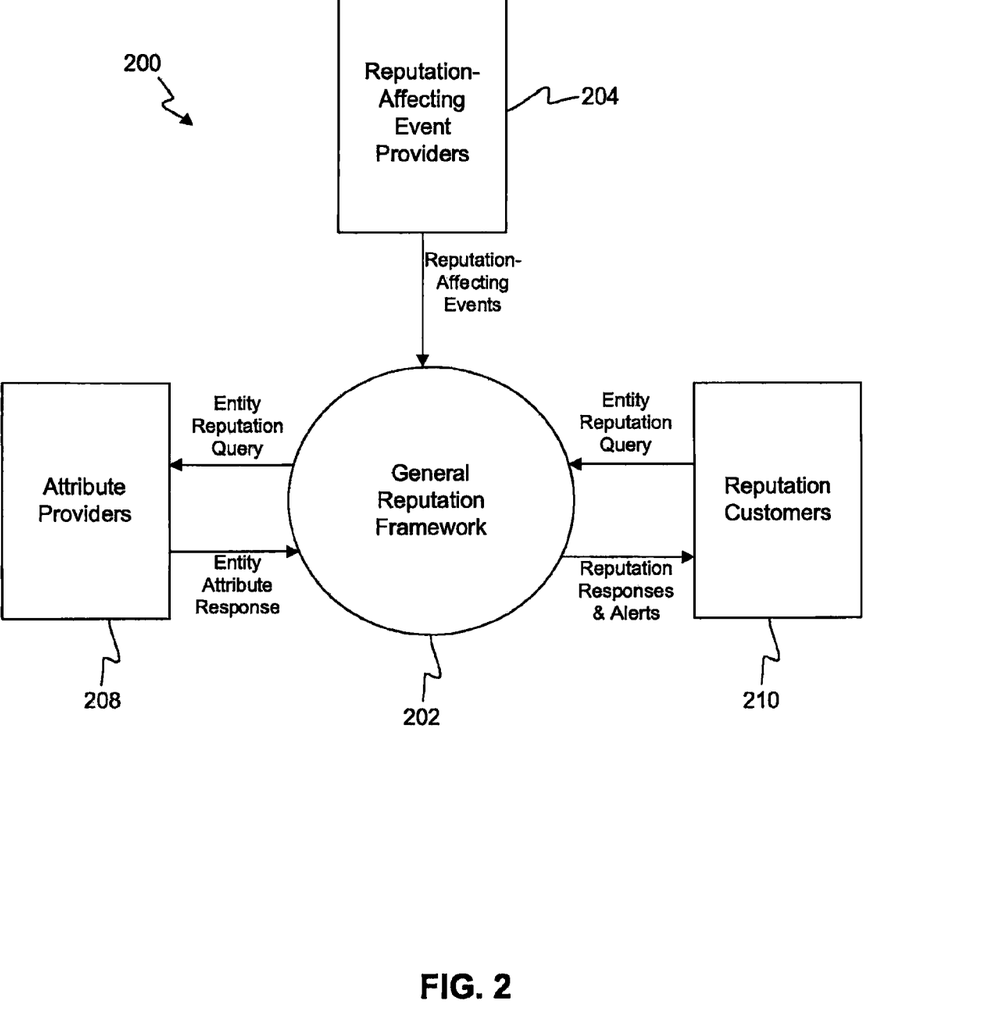
FIG. 2 is a block diagram of an exemplary system for creating and updating reputation records, consistent with certain embodiments of the present disclosure.

FIG. 2 depicts a block diagram of an exemplary embodiment of a general reputation system 200. General reputation system 200 may include a general reputation framework 202, as well as one or more reputation-affecting event providers 204, attribute providers 208, and reputation customers 210. General reputation system 200 may be a cost-effective reputation system designed to be highly flexible and reusable by various types of electronic messaging applications desiring to incorporate reputation values. General reputation system 200 may provide the capability of creating and maintaining context-specific reputation data, using general interfaces that allow the input of trust-affecting events and attributes, and the output of queries and responses for trust level information. General reputation framework 202 may incorporate a trust determination function ("TDF"), which, in one embodiment, may be a mathematical formula that calculates a reputation score and a confidence factor, for a particular user (GUID), IP address, or any other key, based on a plurality of inputs, such as "attributes" and "seed data" created by event notifications. For example, the trust determination function may be of the variety disclosed by E. Zheleva et al. in "Trusting Spam Reporters: A Reporter-based Reputation System for Email Filtering," ACM Transactions on Information Systems, Vol. V, No. N, December 2008, Pages 1-37.

In one embodiment, general reputation system 200 may manage context-specific trust levels for each key (i.e., for each entity). For example, a user may be assigned a first trust level based on parameters important to a first messaging system, such as an email system, and a second trust level for a second messaging system, such as an instant messaging system. General reputation system 200 may also be able to combine trust levels from different contexts to produce one aggregate trust level for a given key, to allow other applications to benefit from certain trust information without providing a specific trust determination function. General reputation system 200 may also support different types of entities, or keys, for which reputation is determined. For example, trust values could be maintained for users, identified by screen-name or GUID; separately maintained for IP addresses; or separately maintained for internal domains and external domains.

In one embodiment, general reputation framework 202 may include an internal interface that is configured to provide input variables to a trust determination function and to receive the results of such a function. General reputation framework 202 may also include an internal interface that is configured to retrieve key attributes from attribute providers 208, for use as input variables to a trust determination function. General reputation framework 202 may also include an internal interface that is configured to provide a general external interface for receiving reputation-affecting events from reputation-affecting event providers 204. General reputation framework 202 may also include an internal interface that is configured to provide a general external interface for receiving reputation queries from and sending corresponding responses to reputation customers 210. General reputation framework 202 may also include an internal interface that is configured to provide a general external interface for sending reputation alerts to reputation customers 210. For example, an alert could be used to announce when a significant change in trust level has occurred. General reputation framework 202 may also include an internal interface that is configured to provide a mechanism for a server to subscribe to a reputation alert.

In certain embodiments, general reputation system 200 may detect sudden behavior changes of a key based on defined parameters provided by the specific application. When detected, these changes may cause the system to perform certain prescribed functions, such as providing alerts. General reputation system 200 may also be able to perform real-time reputation updates when receiving new inputs. General reputation system 200 may also provide a general mechanism by which discrete reputation categories, or trust levels, can be defined for a specific application. For example, using broad discrete levels, the categories might be "trusted," "unknown," and "untrustworthy." These discrete categories may be mapped to an internal trust level, which may be defined on a continuous numeric scale. General reputation system 200 may also provide an additional level of secure access to control port commands that might output any personal user information, including commands that produce reports, as well as simple outputs to a control port.

General reputation system 200 may also support queries for providing historical events, trust level scores, and all contributing factors for a given key (e.g., user name). General reputation system 200 may also support queries on the reputation history for a given key, for example, to identify a timeframe during which an account was compromised. General reputation system 200 may also encrypt user names, attribute data, and event labels in the output for any queries providing a history of user events. General reputation system 200 may also include a separate offline decryption tool for decrypting any encrypted output from the system. General reputation system 200 may also provide plain text output for queries on user trust levels. General reputation system 200 may also provide an SQL-like query capability using multiple data variables as input to provide aggregate counts of how many keys meet the query. General reputation system 200 may also provide significant detailed logging as the trust level changes for a given key. When logging messages including keys, general reputation system 200 may encrypt the key value, which may be decrypted using the offline decryption tool. General reputation system 200 may also provide an operational command for deleting a specific key and its associated reputation data, as well as a capability to archive all reputation data for all keys, including deleted keys.

As will be described in more detail below, general reputation system 200 may be used to perform reputation creation, update, deletion, query, reporting, and alerting for any number or type of entities interacting with an electronic messaging system. Thus, as described above, general reputation system 200 may provide reputation information for any type of application or entity configured to interface with general reputation framework 202.

Figure 3:
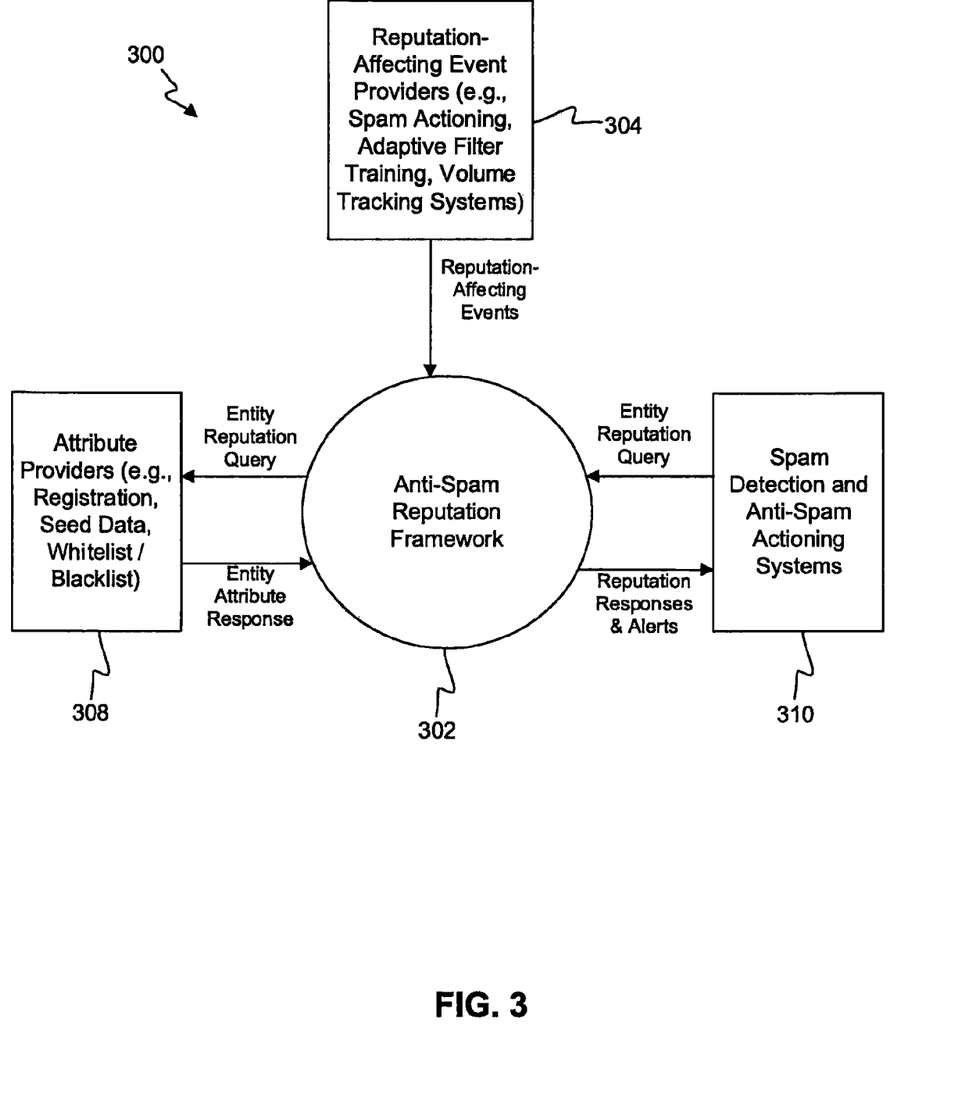
FIG. 3 is a block diagram of an exemplary system for creating and updating reputation records for anti-spam purposes, consistent with certain embodiments of the present disclosure.

FIG. 3 depicts a block diagram of a specific instance of general reputation system 200, embodied in an exemplary anti-spam reputation system 300. Anti-spam reputation system 300 may include its own trust determination function that is specific to a given application, and any specific external interfaces to existing systems that can provide entity (key) attributes used as inputs to the trust determination function. For example, if account creation date is an input to the function and it can be retrieved from a known service using an already-existing interface, then the specific instance may include an interface for retrieval of that input.

In one embodiment, anti-spam reputation system 300 may include an anti-spam reputation framework 302; spam reputation-affecting event providers 304, such as spam actioning, adaptive filter training, and volume tracking systems; attribute providers 308, such as registration, seed data, and whitelist/blacklist providers; and spam detection and anti-spam actioning systems 310.

Anti-spam reputation framework 302 may define any internal project interfaces needed to store the results of its trust determination function as well as any specific inputs. Outputs from the trust determination function may be used for (1) more quickly detecting spam based on reports of trustworthy, reputable users only, and (2) for identifying potential sources of spam for which an action should be taken. In one embodiment, anti-spam reputation framework 302 may include interfaces configured to receive inputs form reputation-affecting event providers 304, such as spam actioning, adaptive filter training, and volume tracking systems. For example, anti-spam reputation framework 302 may receive inputs relating to various high volume behaviors (e.g., email sending, TINS reporting, etc.) as dictated by the trust determination function. Anti-spam reputation framework 302 may also include interfaces configured to receive attributes specific to the trust determination function for the anti-spam reputation framework 302 from attribute providers 308. For example, anti-spam reputation framework 302 may support new reputation seeding triggered by various events including: registration of a new member accounts, SPAM reports, and TINS reports. Anti-spam reputation framework 302 may also include interfaces configured to receive entity reputation queries from spam detection and anti-spam actioning systems 310, and send corresponding anti-spam reputation responses and alerts, as desired.

Any trust determination function implemented by anti-spam reputation framework 302 may incorporate any number or combination of variables as inputs, including, for example: registration attributes, such as account creation timestamp; SPAM reporting events and behavior (e.g., the number of member-submitted events in a given time period); spam report events that network spam filters agree with (and vice versa); TINS reporting events and behavior that network spam filters agree with (and vice versa); TINS report events overridden by member mail controls (and whether spam filters agreed or disagreed); email sending behavior; sent email attributes (e.g., the number of recipients per email, per hour, per day, number of emails per hour, number of mails sent to non-existent addresses, etc.); email listing behavior; email reading behavior; an instant messaging hostility score; action events on the account (e.g., image challenge); whitelist/blacklist history; mail volume data; number of mails hitting bait accounts; and feedback-loop behavior.

In one embodiment, the trust determination function may be defined such that it is resistant to intentional system manipulation, such as spammers deceiving the system to create "trusted" accounts that can work around the system. Similarly, the trust determination function may be defined in a manner that makes it difficult for users of unknown trust to become trusted as well. The trust determination function may also avoid falsely categorizing "good" entities as "bad" entities. Because those with a bad reputation may be acted upon, such as via a spam actioning system 310, the trust determination function may take into consideration many factors before placing a user in the "untrustworthy", or "bad", category. In many cases, if a user cannot be trusted, it may be more desirable to place them in the "unknown" category rather than a "bad" category, where they may be acted upon.

Figure 4:
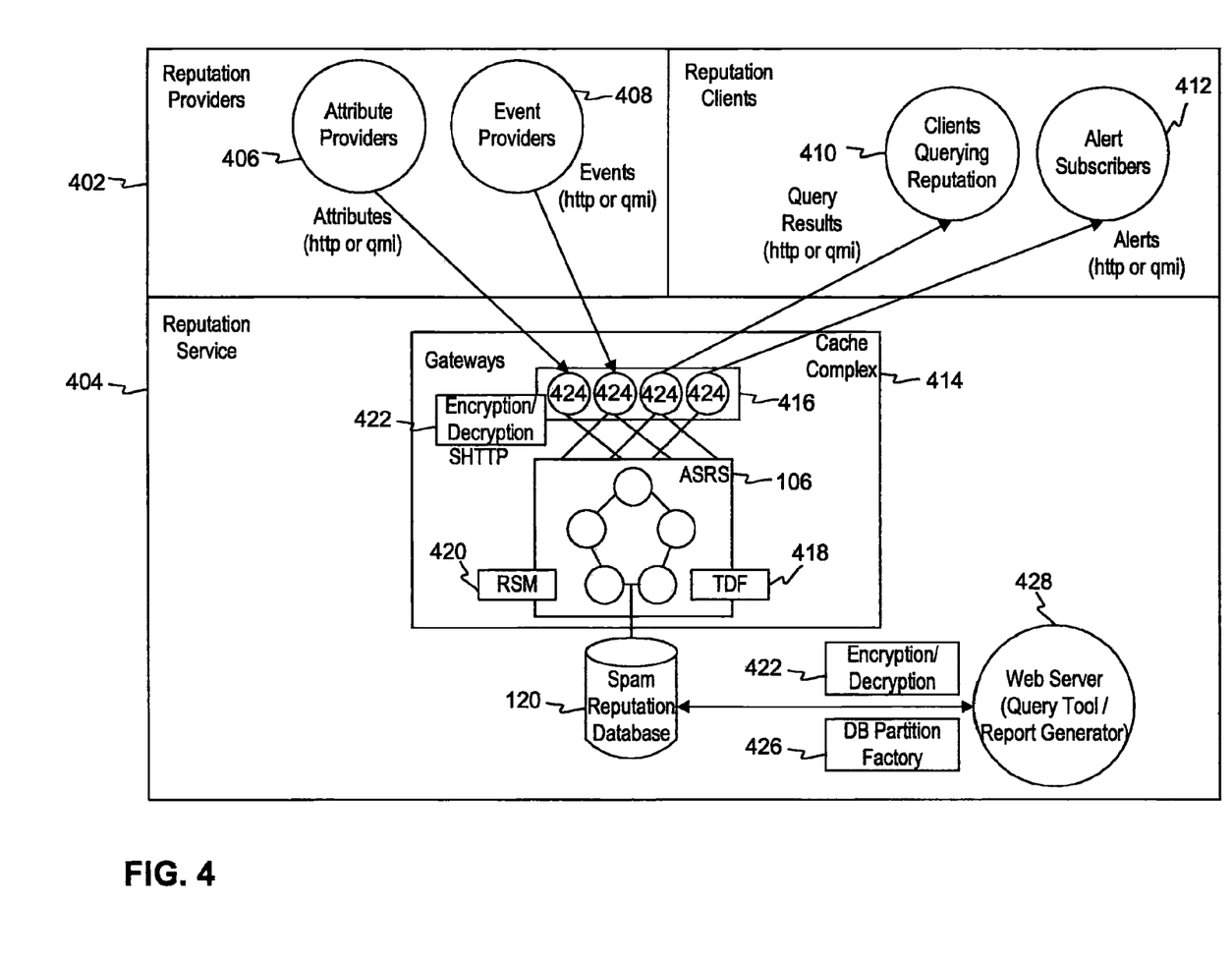
FIG. 4 is a block diagram of an exemplary architecture for creating and updating reputation records, consistent with certain embodiments of the present disclosure.

Referring now to FIG. 4, a block diagram is depicted for an exemplary top level architecture configuration of a reputation services system. Components of the architecture may include servers, databases, server-to-server interfaces, and server-to-database interfaces. As shown in FIG. 4, the exemplary architecture may generally include reputation clients 402 and a reputation service 404. Reputation clients 402 may include attribute providers 406, event providers 408, reputation clients 410, and alert subscriber clients 412, all consistent with the exemplary embodiments of the providers and clients described with respect to FIGS. 2 and 3, as well as reputation provider servers 108 and reputation client servers 110, as disclosed with respect to FIG. 1. For instance, attribute providers 406 and event providers 408 may be embodied in one or more of reputation provider servers 108 of FIG. 1. Likewise, reputation clients 410 and alert subscriber clients 412 may be embodied in one or more of reputation client servers 110. Reputation service 404 may generally include a cache complex 414, which may be embodied in a gateway server 416 and anti-spam reputation server 106; a spam reputation database 120; and a web server 428, which may be configured to operate as a query tool and report generator.

Gateway server 416 may include any type of gateway server configured to interact between anti-spam reputation server 106 and any outside providers and/or clients. Gateway server 416 may include a plurality of gateways 424 and an encryption/decryption library (EDL) 422, which may be configured to encrypt and decrypt keys that are passed in from the external clients. Gateway server 416 may also append the incoming service_type (e.g., spam, spim) and the key together to access the cache complex 414. For instance, if the service_type is SPAM and the key is GUID 1234567890, then EDL 422 may create the following "bat key" having both service_type and key: SPAM_1234567890.

Encryption/Decryption Library (EDL) 422

Gateway server 416 may be configured to use EDL 422 to encrypt and decrypt incoming keys. An OpenSSL library, which uses EVP routines and a blowfish algorithm may be used for encryption and decryption. An interface to the EDL may be performed through two function calls (encrypt and decrypt), as follows: "encrypt (input_buf, key, iv, output_buf)," where "input_buf" is the text desired to be encrypted, "key" and "iv" are keys to use in encrypting, and "output_ buf" is the returned encrypted text; and "decrypt (input_buf, key, iv, output_buf)," where "input_buf" is the encrypted text, "key" and "iv" are keys, and "output_buf" is the returned decrypted text. EDL 422 may use EVP cipher routines, which are a high level interface to certain symmetric ciphers. The public and private keys ("key" and "IV" above) may be stored in spam reputation database 120 to enable the encryption and decryption of data. The keys may be stored with start/end time periods, and new keys may be re-calculated (e.g., every month). EDL 422 may also determine which key was used to encrypt/decrypt the data based on the start/end date of the key's life and the insert time of the data record to be decrypted.

In addition to EDL 422, the gateways 424 may provide the following Tcl commands: RS_GET_REPUTATION <service_type name> <key> <tdf_id> for verifying that a key exists, and to determine if it is successfully accepting data; RS_DELETE_KEY <service_type name> <key> for deleting a reputation key and its associated reputation data; RS_GET_REPUTATION <service_type name> <key> <tdf_id> for displaying a key's reputation score and confidence factor by service type; RS_GET_REPUTATION_HISTORY <service_type name> <key> for returning a history of events for service_type and key; and RS_ENCRYPTION_KEY <key value 1> <key value 2> <start date/time> <end date/time> for gateways 424 to read in a configuration file for setting the encryption keys.

Anti-Spam Reputation Server 106

Anti-spam reputation server 106 may include a trust determination function (TDF) engine 418, a reputation service mapping (RSM) engine 420, and various functions to create, update, delete, and re-synch a reputation value, based on event notifications received from clients 402 through gateways 424.

Trust Determination Function (TDF) Engine 418

As described above, the trust determination function (TDF) may be a mathematical formula that calculates a reputation score and confidence factor, of a particular user (GUID), IP address, or any other key, based on a plurality of inputs. TDF engine 418 may provide a general way to define trust functions and the variables that are input/output to the function. In one embodiment, Tcl language may be used to define the function and logic to allow for suitable maintenance and extensibility. The Tcl code may have the advantage of not needing to be recompiled to adjust trust functions. In addition, it may possible to provide multiple TDFs for each key, thereby providing context-specific reputations, whereby a key may have multiple reputation scores based on context. The multiple TDFs may be stored in memory and may produce multiple scores for each key (one score per formula). As a result, each key may have multiple TDFs associated with it in cache complex 414 and spam reputation database 120. In one embodiment, each TDF may be defined by a separate Tcl script in its own file which can be executed at runtime. The input constants needed by the script may be set in a Tcl interpreter prior to executing the TDF. A TDF version history may be kept to track when the TDF is changed. Events affecting trust scores may be buffered until one of the following conditions is met, at which point the trust score for the given key may be re-computed: e.g., a query occurs for this key; a configurable alert lag time expires for this key; or a configurable N number of events have been buffered for this key. In one embodiment, each TDF may output a score value, which may be a double-precision floating point number between 0 and 1, where 1 represents the highest score of 1.0; and each TDF may output a confidence factor, which may be a double-precision floating point number between 0 and 1, where 1 represents the highest score of 1.0.

Reputation Service Mapping (RSM) Engine 420

Reputation Service Mapping (RSM) engine 420 may be a general mapping list used by anti-spam reputation server 106 to define which input variables are needed for each particular TDF. In one embodiment, RSM engine 420 may have functions for adding, updating, and deleting service mappings and trust categories from the mapping list. The mapping list may be defined using Tcl language, which may allow for easy modification of the mapping list when new services desire to use the reputation system. RSM engine 420 may also allow for the definition of discrete reputation categories by which categories, or trust levels, can be defined for a specific application. For example, the categories "trusted," "unknown," and "untrustworthy" may be discrete categories which map to an internal trust level that may or may not be on a continuous numeric scale. Additionally, there may be thresholds set per service to determine which category (e.g., trusted, untrustworthy, etc.) a particular key falls into.

Cache Complex 414

Cache complex 414 may be any suitable type of general-purpose distributed memory caching system. In one embodiment, cache complex 414 may be used to manage, provide, and store reputation data to include the reputation score, confidence factor, and the input variables to TDF engine 418. Cache complex 414 may provide a general data framework in which to store data elements, including: a key, a reputation category, a reputation score, confidence factor, and a parameter list. The key may include a service type and a user-provided unique identifier. A key may be associated with any number of Type Length Value records ("TLVs"). The reputation category may be the trust level that can be defined for a specific application, such as, for example, "trusted," "unknown," and "untrustworthy." The reputation score may be an integer, decimal, or percentage defining the reputation level within a given category. The parameter list may be a pointer to a list of Type Length Value (TLV) records, where "type" is an identifier or label for a piece of user data, "length" identifies the length of the data that follows, and "value" identifies the specific user data value for a given type. For instance, for service_type SPAM, the TLV may contain the input variables for the TDF that would have types such as A, B, C (equating to TINS, TIS, TIS_SPAM, for example), and the values may be the counts of those reputation event types. Thus, in some embodiments, cache complex 414 may provide the following functions of: interfacing with reputation data stored in spam reputation database 120; caching reputation data per key for each reputation service type; retrieving reputation data from a persistent storage system in the event of a cache miss; handling reputation data "get" requests and returning data to the requestor; and updating both the cache and the persistent storage system (spam reputation database 120) on an update.

Spam Reputation Database 120

Spam reputation database 120 may include any suitable type of physical, persistent data storage system, such as a Sybase or MySQL database, which may be provided in communication with anti-spam reputation server 106 and web server 428. Spam reputation database 120 may be configured to store reputation records created and/or updated by server 106. In one embodiment, the data structures stored in spam reputation database 120 may match those stored in cache complex 414, but may be broken out into separate physical database tables. For example, the key, reputation category, reputation score, and confidence factor, may be stored in a REPUTATION_SPAM table, whereas the TDF input variables, or training event counts for the service type SPAM, may be stored in a REPUTATION_VAR_SPAM table. Finally, a REPUTATION_HIST_SPAM table, whose data may not be cached, may store the raw event data that arrived from the various reputation event providers. In one embodiment, the REPUTATION_SPAM database containing the calculated score may be needed to (1) allow for efficient SQL-like queries on scores (thus avoiding a computation for every key), and (2) allow for simplified potential sharing of reputation information with other applications or entities. The table definitions may provide an efficient and general data framework in which to store data, utilizing keyValue, tagValue, and dataValue fields. For instance, the table definition for the reputation_spam table may contain a dataValue field which may be of double format to allow double-precision floating point values to be stored there for the reputation score and confidence factor; or the table definition for the reputation_var_spam table may contain a dataValue field which may be of integer format for input variables, since different services may have different numeric input variable formats for their TDF formulas. Furthermore, for the reputation_hist_spam table, the table may contain a varbinary field which allows for different data types to be stored. Allowing for different data types to be stored in the field may make the service more general. However, since the field is varbinary, a SQL "convert" function may be desired to convert numeric (integer and float) values to Hex, which may be stored in the varbinary field. For example, on an insert of a member named, John Smith, whose GUID is some number that when encrypted equals 1234567890, a reputation score may be converted to binary using, for example, a numeric precision of 5 and scale of 2 (which can support a number such as 0.67, or 100.00 for a score), as follows: insert into reputation_hist_spam (keyValue, tagValue, dataValue) VALUES (1234567890, 2, convert(binary, convert(numeric(5,2), 0.67))); (where the 2 in the tagValue is the id for "trusted").

Figure 5:
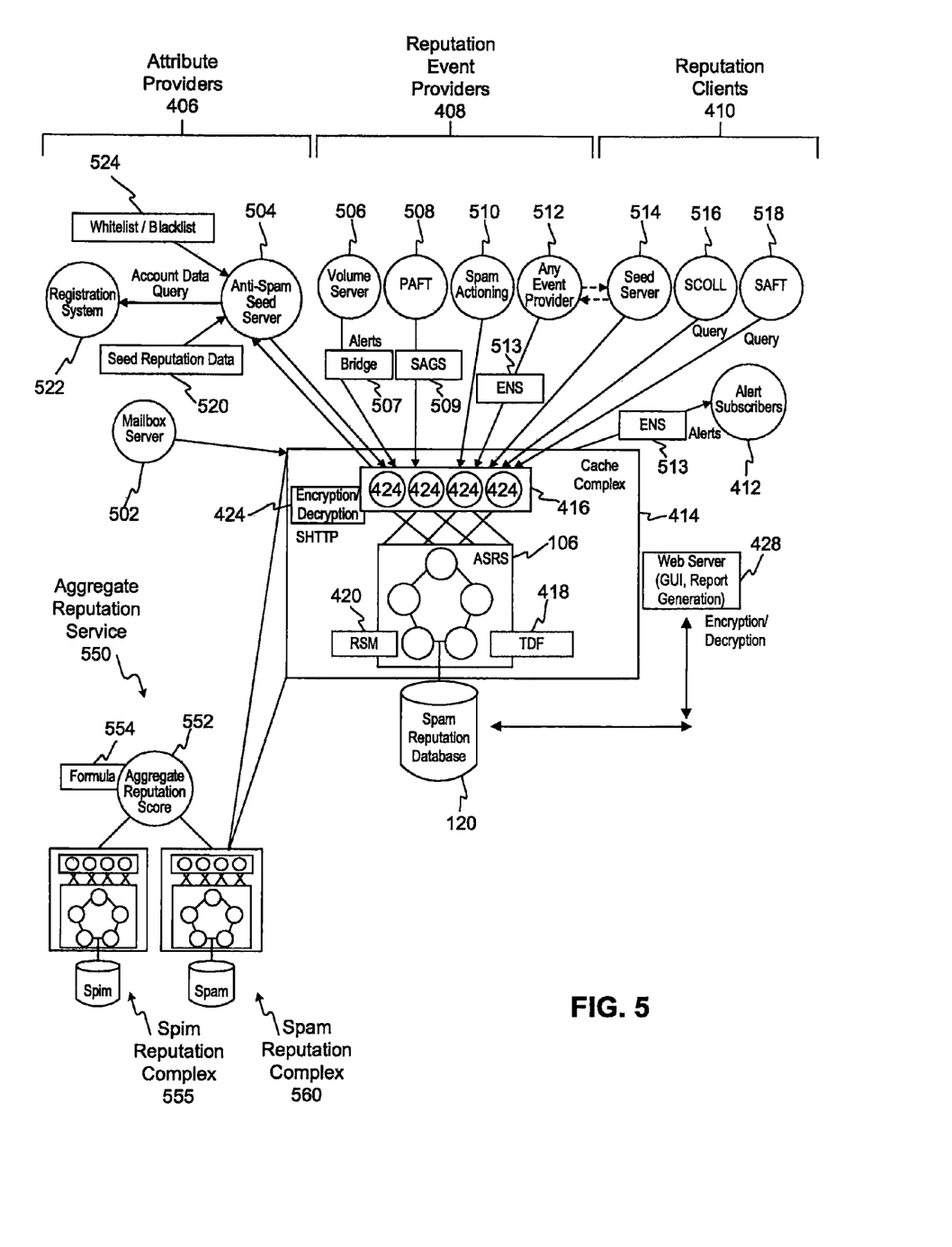
FIG. 5 is a block diagram of an exemplary architecture for creating and updating reputation records for anti-spam purposes, consistent with certain embodiments of the present disclosure.

FIG. 5 depicts a block diagram of an exemplary embodiment of the architecture of the anti-spam reputation service. As described above with respect to FIG. 4, the system may include a plurality of attribute providers 406, reputation event providers 408, reputation clients 410, and alert subscriber clients 412, all in communication with gateway server 416 of the cache complex 414. As shown now in FIG. 5, the attribute providers 406 may include a mailbox server 502 and an anti-spam seed server 504. The event providers 408 may include a volume server 506, a personal adaptive filter training (PAFT) complex 508, a spam actioning complex 510, and any other event provider 512. The reputation clients 410 may include a seed server 514, a spam collective server (SCOLL) 516, and a shared adaptive filter training (SAFT) system 518, among any other filters or spam systems.

Mailbox Server 502

Mailbox server 502 may be configured to communicate with gateways 424 of anti-spam reputation server 106, for providing mail behavior events and mailbox cancel alerts. For example, when a user subscribes to or cancels a mailbox, mailbox server 502 may be configured to send an event to anti-spam seed server 504, which may then send an RS_DELETE_KEY request to anti-spam reputation server 106.

Anti-Spam Seed Server 504

Anti-spam seed server 504 may be supplied with attribute information and seed data from, for example, a seed reputation database 520, a registration system 522, and/or a whitelist/blacklist database 524. In one embodiment, anti-spam seed server 504 may be a new server configured to handle spam-specific data gathering in order to create new spam reputations or to delete spam reputations. As will be described in more detail below, there may be at least three exemplary ways to initiate the creation of a reputation: (1) via a Tcl command from anti-spam seed server 504; (2) from a specified number of events of a given type; or (3) from incoming CREATE or UPDATE events with a "create_if_not_exists" flag. As a result, anti-spam seed server 504 may have a Tcl command configured to read in a configuration file of reputation keys to create (e.g., member GUIDs to create). Anti-spam seed server 504 may also be able to create a reputation based on a specified number of events of a given type. The number of events of a given type may be set in volume server 506, and an alert may be sent to anti-spam seed server 504 when the threshold is hit. This alert may cause anti-spam seed server 504 to send an RS_CREATE_KEY request to gateway server 416. Anti-spam seed server 504 may be able to obtain seed data for creating new reputations from one or more of the following sources: Tcl configuration files; account creation dates from registration system 522; an IP address from a member's registration; audio or image challenges from registration; and a number of failures for audio or image challenges on registration. In one embodiment, anti-spam seed server 504 may be able to receive cancel reputation events from the mailbox service 502. In one embodiment, anti-spam seed server 504 may be configured to provide an initial reputation score and confidence factor to be seeded. Such an initial seed reputation score and confidence factor, which may be sent via a create event, may then be used in a TDF formula as an "old score" variable, and "old confidence factor".

Volume Server 506

Volume server 506 may include any suitable type of server that is configured to trigger alerts to anti-spam seed server 504 for reputation creation, when a number of events reaches a predetermined threshold. Volume server bridge 507 may accept volume server alerts and trigger a CREATE event notifications that may be sent to gateways 424. Such CREATE event notifications may have the "seed_data_provided" flag set to FALSE. Volume server 506 may be configured to send such event notifications and alerts to volume server bridge 507. Volume server bridge 507 may also be able to handle UPDATE events from volume server 506. Such UPDATE events may have the "create_if_not_exists" flag set to YES.

Personal Adaptive Filter Training (PAFT) Complex 508

PAFT complex 508 may be configured to communicate with a spam agreement server (SAGS) 509 for correlating event signatures to known spam signatures. Thus, PAFT complex 508 may be configured to send an RS_ADD_EVENT to gateways 424 via SAGS 509 for training events; and send a TINS or TIS event_type along with the RS_ADD_EVENT. For a TINS or TIS event type, there may be multiple tags in the Tag Length Value (TLV) fields of the RS_ADD_EVENT request. SAGS 509 may be configured to correlate incoming event signatures from PAFT complex 508 with a known spam signature list, and based on the correlation, to determine whether the event is of the type TINS, TINS_SPAM, TIS, TIS_SPAM, or TIS_NOT_SPAM, and to modify an event tag accordingly before sending it to gateways 424. In particular, SAGS 509 may be configured to receive a spam signature list through a Tcl port command. When an incoming event arrives from PAFT 508, SAGS 509 may extract the signature and check it against the signature list, update the event type in the RS_ADD_EVENT based on the signature correlation, and send the event to one of the gateways 424.

Spam Actioning Server 510

Spam actioning server 510 may be configured to interact with gateways 424 of anti-spam reputation server 106, for providing actioning events and for querying reputations. For example, spam actioning server 510 may be configured to detect spamming, and then query anti-spam reputation server 106 to determine whether a user email account should be acted upon. If action is desired, spam actioning server 510 may be configured to suspend an account, permanently terminate an account, scramble the password for the account, etc. For example, spam actioning server 510 may interact with an e-mail server, such as the email server 104 depicted in FIG. 1.

Event Provider 512 & Seed Server 514

Event provider 512 may be any type of server that is disposed in communication with an electronic messaging or communications system, and configured to generate event notifications. Seed server 514 may be any type of server configured to obtain seed data from an external source, based on alerts created by event provider 512. The event provider 512 may be configured to send a seed request directly to its own "seed server" to have the seed server initiate the Create event notification, as depicted by the dashed lines between the "any event provider" 512 and "seed server" 514. Thus, any event provider 512 may send a CREATE event notification without seed data included to seed server 514, which may obtain seed data from any external source.

SCOLL Complex 516

Spam collective ("SCOLL") complex 516 may be configured to interface with gateways 424 of anti-spam reputation server 106 for querying reputation data. SCOLL complex 516 may be configured to query the reputation system for each email recipient and log whether they are trustworthy vs. untrustworthy. For instance, SCOLL complex 516 may be configured to send an RS_GET_REPUTATION request to one of the gateways, and receive a RS_GET_REPUTATION_RESPONSE message containing the reputation category (e.g., Trusted, Untrusted, Unknown), the reputation score for the key (e.g., member GUID or IP address), the confidence factor for the reputation, and the TDF ID.

SAFT System 518

SAFT system 518 may be configured to interface with one of the gateways 424 of anti-spam reputation server 106, for querying reputation data to assist in determine whether training events should be used in training or not. Thus, SAFT system 518 may be a client system configured to benefit from reputation data that is created, updated, and stored by anti-spam reputation server 106.

Alert Subscribers 412

In one embodiment, alert subscribers 412 may be able to subscribe to alerts created by anti-spam reputation server 106. Anti-spam reputation server 106 may be able detect changes in the trust level for a key, and be able to log the change. For instance, if the trust level changes from the discrete category "trusted" to "untrustworthy", anti-spam reputation server 106 may generate a report, or alert, to be sent to alert subscribers 412. In one embodiment, anti-spam reputation server 106 may provide an alert subscription function that allows for the adding/updating of subscriptions to alerts, and send alerts to those client systems that have subscribed.

Web Server 428

Web server 428 may be any suitable type of web server having a GUI and report generation capability configured to allow users to query the data, and report on the data. Web server 428 may be configured to interface with spam reputation database 120 to send queries and receive data. Web server 428 may also be configured to utilize the data encryption/decryption tool 422, as shown in FIG. 4, to decrypt data. In one embodiment, web server 428 may be an Apache server with a GUI front end. Thus, upon receipt of a query for the reputation score and confidence factor for a key, the key may not need to be encrypted.

For example, if it is desired to display the reputation level and score for key=John Smith, the GUI tool of web server 428 may call the EDL, encrypt the key, and then query the database for: REPUTATION_SPAM, which may return all the fields in the key's reputation record, such as, key, trust level ID, and trust score. In one embodiment, the GUI tool displays the reputation score as a double-precision floating point number and the confidence factor as a double-precision floating point number to the user. To display the input variables to the TDF formula for key=John Smith, the GUI tool may call the EDL, encrypt the key, and then query the database for: REPUTATION_VAR_SPAM, which may return the reputation variables and their values that are input into the TDF. In one embodiment, the GUI tool displays as integers the static variables that went into the formula (e.g., alpha, beta scores).

Aggregate Reputation Service 550

Aggregate reputation service 550 may be configured to combine trust levels from different contexts to produce one aggregate trust level for a given key. Thus, aggregate reputation service 550 may allow other applications to reap the benefit of some trust information without providing its own trust determination function. As shown in FIG. 5, aggregate reputation service 550 may include an aggregate reputation score 552, which is calculated based on an aggregate formula 554, which receives inputs from a plurality of reputations systems, such as spim reputation complex 555 and spam reputation complex 560. In one embodiment, aggregate reputation service 550 may be configured to query each service type's complex to obtain key reputation scores and confidence factors and combine them using formula 554 to obtain aggregate reputation score and confidence factor 552. Aggregate reputation score and confidence factor 552 may then be used in any type of spam actioning system, alert system, and/or reporting system.

Exemplary Methods

In one embodiment, the systems described in FIGS. 1-5 may be used to perform a method of creating and updating reputation records, for use in managing electronic communications and messaging systems, such as e-mail and instant messaging systems. In one exemplary embodiment, the method may include six major functions: (1) reputation creation, which uses an application-specific trust determination function to create a reputation for a new key; (2) reputation update, which uses an application-specific trust determination function to update and maintain a key's reputation based on external inputs; (3) reputation query response, which handles external queries and provides a response that can include reputation information at the individual key level and/or the aggregate level; (4) reputation alerts, which provide the ability to alert subscribing servers that desire to be notified when there is a significant change in trust level for a given key; (5) reputation reports, which respond to queries or automated schedules with reputation reports at either the individual key level or the aggregate level; and (6) reputation deletion, which can either use an operation command or an application-specific trust determination function for defining when to delete a reputation record.

Exemplary Method: Reputation Creation

In one embodiment, there may be four ways to initiate the creation of a reputation record: (1) from a Tcl command in the anti-spam seed server; (2) from a specified number of events of a given type; (3) from incoming CREATE events with a "seed_data_provided" flag set; or (4) from incoming UPDATE events with a "create_if_not_exists" flag set.

If a Tcl command from anti-spam seed server 504 causes a CREATE event notification to be sent to anti-spam reputation server 106 (1$^{st}$ way), the Tcl command may specify a list of keys to create (e.g., from a whitelist/blacklist 524, registration system 522, etc.). The Tcl command may read in a list of keys and associated data, and send CREATE event notifications to the gateways 424 via a messaging interface. The CREATE event notification may have a "seed_data_provided" flag set to TRUE. The event notification may also allow for an initial score to be seeded. The gateway may process the event notification, extract the key, and encrypt the key. The encrypted key, along with other data associated with the event, may then be sent from the gateway to the anti-spam reputation server (ASRS) 106, where the server determines whether the reputation record already exists or not. If the record does not exist, any initial seed trust score and seed confidence factor may be used to create the reputation. Otherwise, the trust determination function (TDF) engine 418 may be called to calculate the reputation score and confidence factor. A reputation record having the reputation score, confidence factor, and key may then be created in cache and in the database (if it already exists, and this is a duplicate create event, an error may be returned). Additionally, for purposes of fighting spam, an initial set of keys may be seeded along with their training event counts. As a result, anti-spam seed server 504 may first send a create event to the anti-spam reputation server 106, followed by update events with the training event counts for the key created.

If a specified number of events of a given type triggers reputation creation (2$^{nd}$ way), volume server (VS) 506 may send an alert to VS bridge 507. VS bridge 507 may send a CREATE event notification to gateways 424. The CREATE event notification may have a "seed_data_provided" flag set to FALSE. The gateway may process the event notification, extract the key, and encrypt the key. The encrypted key, along with other data in the event, may then be sent from the gateway to the anti-spam reputation server (ASRS) 106, where the server determines whether the reputation already exists or not. If the reputation already exists, and this is a duplicate create event, an error may be returned. If the reputation does not already exist, then the server may check the "seed_data_provided" flag, which is set to FALSE, and then send a seed request off to anti-spam seed server 504. Anti-spam seed server 504 may obtain the desired seed data from external sources, such as registration system 522 and configuration seed files 520, and send a CREATE event notification, with the "seed_data_provided" flag set to TRUE, back to one of the gateways 424. The gateway may process the event notification, extract the key, and encrypt the key. The encrypted key, along with other data in the event, may then be sent from the gateway to the anti-spam reputation server 106, where the server may then use the event to create a new reputation. The Trust Determination Function (TDF) engine 418 may be called to calculate the reputation score and confidence factor and the reputation record may be created in cache and in spam reputation database 120 (if it already exists, and this is a duplicate create event, an error may be returned).

If reputation creation is initiated by an incoming CREATE event with a "seed_data_provided" flag set to FALSE (3$^{rd}$ way), the event may be sent from the external event provider 512 to one of the gateways 424. The gateway may process the event notification, extract the key, and encrypt the key. The encrypted key, along with other data in the event, may then be sent from the gateway to anti-spam reputation server 106, where the server determines whether the reputation already exists or not. If it already exists, and this is a duplicate create event, an error may be returned. If the reputation does not already exist, then the server may check the "seed_data_provided" flag, which is set to FALSE, and then send a seed request off to anti-spam seed server 504. Anti-spam seed server 504 may obtain the seed data, and send it back to one of the gateways in a CREATE event notification, with the "seed_data_provided" flag set to TRUE. The gateway may process the event notification, extract the key, and encrypt the key. The encrypted key, along with other data in the event notification, may then be sent from the gateway to anti-spam reputation server (ASRS) 106, where the server may use the event to create a new reputation, which is stored in cache and spam reputation database 120.

If reputation creation is initiated by an incoming CREATE event with a "seed_data_provided" flag set to TRUE (alt. 3$^{rd}$ way), the event may be sent from the external event provider 512 to one of the gateways 424. The gateway may process the event notification, extract the key, and encrypt the key. The encrypted key, along with other data in the event, may then be sent from the gateway to the anti-spam reputation server (ASRS) 106, where the server determines whether the reputation already exists or not. If it already exists, and this is a duplicate create event, an error may be returned. It the reputation does not already exist, then the server may check the "seed_data_provided" flag, which is set to TRUE, and then call the Trust Determination Function (TDF) engine 418 to calculate the reputation score and confidence factor. The resulting reputation record, including reputation score, confidence factor, and key, may be stored in cache and in the spam reputation database 120.

The ability for any event provider 512 to send a CREATE event notification with seed data included may allow other clients of the reputation service to bypass the need for a specific "Seed Server," such as anti-spam seed server 504. In other words, an anti-spam client may use anti-spam seed server 504 to gather seed data from different, external sources and thus benefit from its use; however, other reputation clients may have all the seed data available locally and may not need a separate "Seed Sever" to send seed data with an initial CREATE event notification.

If reputation creation is initiated by an incoming UPDATE event with a "create_if_not_exists" flag set to TRUE, the event notification may be sent to one of the gateways 424. For example, an external event provider 512, such as PAFT 508, may have sent an event notification with a flag set that instructs anti-spam reputation server 106 to create a reputation record if one does not already exist. If the event notification is sent from PAFT 508, it may first go through SAGS 509 to correlate the event's signature to a list of known SPAM signatures. The gateway may process the event notification, extract the key, and encrypt the key. The encrypted key, along with other data in the event, may then be sent from the gateway to the anti-spam reputation server 106, where the server may determine whether the reputation record already exists or not. If it already exists, then the reputation record may be updated, by calling trust determination function (TDF) engine 418 and passing desired input variables for the formula, according to maps provided by RSM 420. TDF 418 may then calculate a reputation score and confidence factor, and return the score to ASRS 106, which may store the new reputation score and confidence factor in spam reputation database 120 for that key. If the record does not exist, then a new reputation may need to be created, by sending a seed request from ASRS 106 to anti-spam seed server 504. Anti-spam seed server 504 may obtain the seed data and return it to a gateway 424 of ASRS 106 in a CREATE event notification, with the "seed_data_provided" flag set to TRUE. The gateway may process the event notification, extract the key, and encrypt the key. The encrypted key, along with other data in the event, may then be sent from the gateway to ASRS 106, where the server may then use the event to create a new reputation. In particular, ASRS 106 may call TDF engine 418 and pass in the desired input variables for the formula, as defined by RSM engine 420. TDF engine 418 may calculate the reputation score and confidence factor and return the score to ASRS 106, which may then store the new reputation score and confidence factor in spam reputation database 120 for that key.

In the case of spam fighting, PAFT 508 may send UPDATE events to the gateways 424 of ASRS 106 with the "create_if_not_exists" flag set to TRUE, which causes ASRS 106 to trigger the seeding of the reputation via a message sent to the seed server 514. However, the architecture may also allow for any event provider to send an UPDATE event with the "create_if_not_exists" set to FALSE, and in the case where the ASRS does not find a record to update, it may return an error back to the event provider with a record-not-found error. The event provider may then send a seed request directly to its own "seed server" to have the seed server initiate the Create event notification, as depicted by the dashed lines between the "any event provider" 512 and "seed server" 514.

Exemplary Method: Reputation Update

If an UPDATE event notification, such as a PAFT training event, is sent from PAFT complex 508 to SAGS 509, SAGS 509 may determine the type of event, e.g. TINS, TINS_SPAM, TIS, TIS_SPAM, or TIS_NOT_SPAM, based on a list of signatures available to SAGS 509. SAGS 509 may then send an UPDATE event to one of the gateways 424. The gateway may process the event notification, extract the key, and encrypt the key. Anti-spam reputation server 106 may store the event that arrived from PAFT complex 508 in an event history table, and the event count may be incremented in an event count table. Anti-spam reputation server 106 may then query all the events for the key, and send the events and other input variables (input variables may be determined by checking RSM engine 420) to TDF engine 418 for re-calculating the key's reputation score and confidence factor. TDF engine 418 may then return the re-calculated reputation score and confidence factor to anti-spam reputation server 106 and store it in spam reputation database 120. In one embodiment, update events affecting reputation scores may be buffered until one of the following conditions is met, at which point the reputation score for the given key is re-computed: a query occurs for this key, a configurable alert lag time expires for this key, or a configurable N number of events have been buffered for this key.

Exemplary Method: Reputation Query/Response

In certain embodiments, reputation consumers, customers, or client may send a query (e.g., a "get reputation" request), to one of the gateways 424. The gateway may processes the incoming query, extract the key, and encrypt the key. The encrypted key may then be sent from the gateway to anti-spam reputation server 106. Anti-spam reputation server 106 may look-up the encrypted key in cache complex 414 and return the query results to the gateway, which decrypts the key, and sends it back to the reputation client, along with the reputation category (e.g., trusted, untrusted), the reputation score, the confidence factor, and the TDF ID.

Exemplary Method: Reputation Alerts

After a reputation update, anti-spam reputation server 106 may be configured to detect a change in the trust level, for that user. Anti-spam reputation server 106 may log this change and provide an alert to various systems that may have subscribed to such alerts. Such an alert may then be sent thru the gateway to decrypt the key. In one embodiment, an alert subscription function of anti-spam reputation server 106 may allow for the adding/updating of alert subscriptions.

Exemplary Method: Reputation Reports

Reputation reports may be generated as requested by an administrator using web server 428. For example, an operations administrator of an electronic communications system may make a request via a control port on one of the gateways 424 or web server 428 for a reputation report to be produced. The produced report may be output in encrypted format for the member's event history, and decrypted format for the member's reputation score.

Exemplary Method: Reputation Deletion

As described in more detail above, mailbox service 502 may be configured to provide alerts on a mailbox cancel. The mailbox cancel alert may then trigger a reputation delete. As a result, anti-spam reputation server 106 may be configured to delete the reputation from cache complex 414 and from spam reputation database 120.

In one embodiment, a Web API may be provided to allow HTTP Get and Post requests to interface with gateway server 416. For example, an HTTP Get request may be provided directly to the gateway server, with the Post occurring thru the Event Notification System (ENS) 513. In another embodiment, an HTTP Post may go directly to the gateway server 416.

Figure 6:
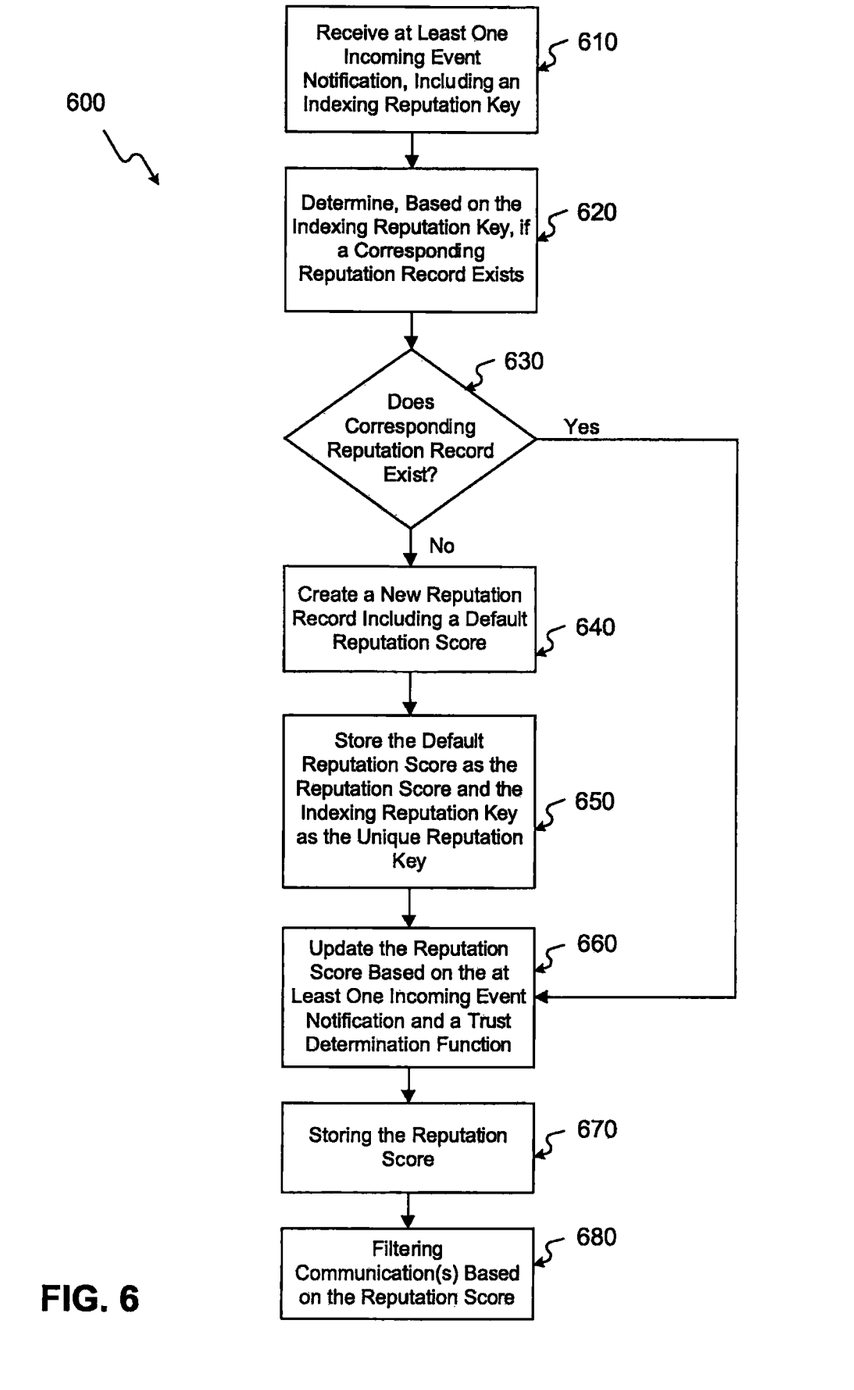
FIG. 6 is a flowchart of an exemplary method for creating and updating reputation records for anti-spam purposes, consistent with certain embodiments of the present disclosure.

FIG. 6 illustrates an exemplary embodiment of a method 600 for creating and updating reputation records, each reputation record including a reputation score, confidence factor, and a unique reputation key. According to the method, at least one incoming event notification, including an indexing reputation key, may be received from an event provider 408 (Step 610). Based on the indexing reputation key, it may be determined whether a corresponding reputation record exists in either cache complex 414 or spam reputation database 120 (Step 620). If the corresponding reputation record exists (Step 630, Yes), the reputation score and confidence factor may be updated using TDF engine 418, based on the at least one incoming event notification and a trust determination function (Step 660). If the corresponding reputation record does not exist (Step 630, No), a new reputation record, including a default reputation score, and default confidence factor, may be created by ASRS 106 (Step 640). When the new reputation record is created, the default reputation score and confidence factor may be stored as the reputation score and confidence factor and the indexing reputation key may be stored as the unique reputation key (Step 650). Finally, after the new reputations record is created, the reputation score and confidence factor may be updated based on the at least one incoming event notification and a trust determination function (Step 660). The new reputation record may then be stored in both the cache complex 414 and the spam reputation database 120 (Step 670). One or more of the reputation client servers 110 and email servers 104 may perform filtering of email messages sent by an entity, based on a reputation score stored in a reputation record associated with the entity's reputation key (Step 680). In one embodiment, an email service provider ("ESP") may perform each step of method 600. Alternatively, an ESP may perform all or part of method 600 in combination with a third party company.

Following the creation or update of a reputation trust score, reputation alerts may be automatically provided to a subscriber or requestor. Spam may be filtered based on the calculated reputation trust score. Suspected spammers may be sanctioned based on the calculated reputation score. The default reputation score and confidence factor may be a predetermined static value previously stored by the reputation server.

Figure 7:
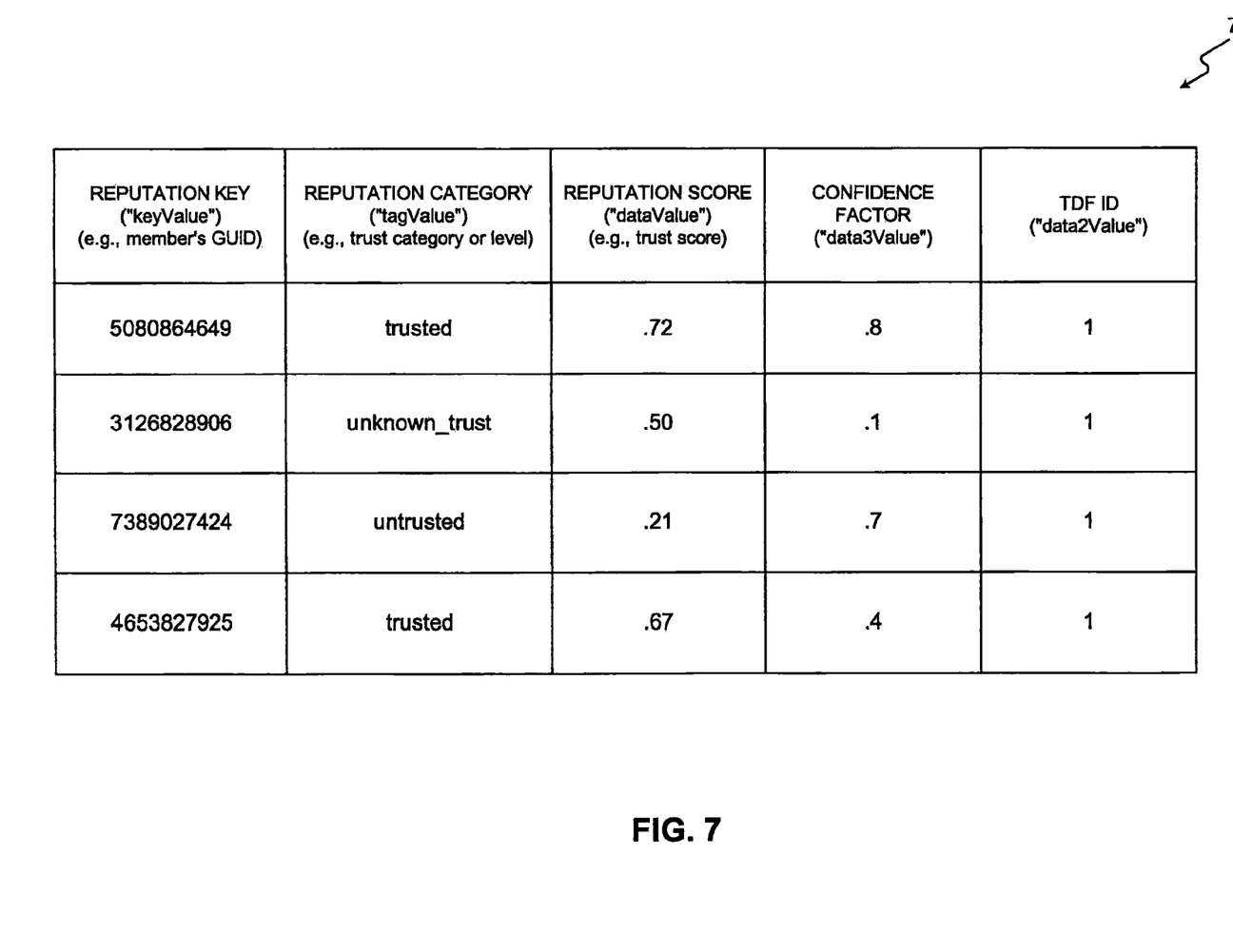
FIG. 7 depicts an exemplary embodiment of a reputation record.

FIG. 7 depicts an exemplary embodiment of a table 700 containing a plurality of reputation records, each reputation record extending along a horizontal row of the table. Thus, as shown in FIG. 7 and described above, each reputation record may include a reputation key, a reputation category, a reputation score, a confidence factor, and a TDF ID. As described in more detail above, each reputation key may be a unique identification for each entity, such as GUID, IP address, etc. Each reputation category may define a general type of reputation, such as trusted, untrusted, or unknown trust. Each reputation score and confidence factor may be a number ranging from 0 to 1. Each TDF ID may be an integer or any other identifier that points to particular TDF to use in relation to the entity. FIG. 7 depicts only one exemplary embodiments of a way to store a reputation record table. Reputation records may be displayed and stored in any other way, such as a text file or any other data file, individually or in groups.

The above-disclosed systems and methods may be used to perform any number or combination of spam fighting techniques, as will be described below. In one embodiment, the present systems and methods may be used to determine the likelihood that a given user will send spam. For example, the system may be used to identify users that may be spamming or not spamming. For example, if a user has just sent 200 emails, which triggers rate limiting and a spam actioning event, the spam actioning system may check the user's reputation and determine this is a "trusted" user. In this case, the user may not be actioned, and the spam actioning system may allow this user to continue sending two to three times the normal amount of mail before actioning the account. Additionally, the different actioning system actions, such as scrambling the password for the account, blocking the account, etc., could be tied to the trust level of the user (e.g., more lenient action taken on a reliable user).

In another embodiment, the present systems and methods may be used to determine the likelihood that a given user account has been compromised and used for spamming. For example, the present systems and methods may be used to determine whether an account has been compromised, or if an account has been set up just for spamming. For example, if a spam actioning system detects a user spamming, but a query of the reputation system reveals the user has been reliable for a predefined period of time, it may be presumed that the account has been compromised. Alternatively, a query of the reputation system may reveal the account has only been used for spamming. Moreover, the reputation alert system may detect a drastic change in the user's reputation trust score and level, and an alert may be sent to the spam actioning system to action the account.

In another embodiment, the reputation system may be used to improve spam detection and bulk-mailer scrubbing by using trusted and untrusted email recipient ratios. In particular, the reputation system may be used to further improve spam detection by determining for each incoming mail, how many recipients are trustworthy vs. untrustworthy users. This information can be used to help determine if a given email is spam. For example, SCOLL complex 516 may query the reputation system for each email recipient and log whether they are trustworthy vs. untrustworthy, and store the counts in a table that can be used to write spam detection rules. This data may also be used to help scrub white list of bulk mailers. The TDF formula may also be revised to replace the input variables, such as TINS and TIS, with events that are more relevant to a scenario in which the reputation entity is an IP address.

In another embodiment, the reputation system may be used to improve the identification of incorrectly deposited email based on trusted user reports. For example, the reputation system may be used to help determine how many reports of spam come from trustworthy users vs. untrustworthy users for an entity (or key), and how many reports of this-is-not-spam come from trustworthy users vs. untrustworthy users, and then use that information for more quickly identifying actual spam being delivered through system, as well as good mail falsely spam-foldered. In some embodiments, this information may then be used to put corrective measures in place.

In another embodiment, the reputation system may be used to identify groups of users with similar reporting patterns. For example, there may be a group of individuals that only reports a certain type of spam and no other type of spam. The methods may further include taking the set of all trusted users and breaking them into groups based on their reporting patterns. The method may further include taking samples of those users' mail reported and use that set to train a "group" focused filter. For this capability, an off-line tool may be used to query the reputation system for data and then group and correlate the data to come up with the grouping of similar patterns. Then the tool may be used to gather samples of those reporting events from the group for the purpose of training a spam filter.

In this manner, the systems and methods disclosed herein may be configured to perform filtering of electronic messages to reduce spam and/or spam campaigns. In addition, the systems and methods disclosed herein may be configured to determine a level of confidence to associate with a user report to improve the reliability of a spam filtering system, which, in turn, improves performance and reduces costs.

It will be apparent to those skilled in the art that various modifications and variations can be made in the system and method for reception in communication networks. It is intended that the standard and examples be considered as exemplary only, with a true scope of the disclosed embodiments being indicated by the following claims and their equivalents.

What is claimed is:

1. A computer-implemented method for filtering electronic messages, comprising:
receiving an event notification;
identifying a trust determination function based on a context, the trust determination function comprising a function for calculating a reputation score and being one of a plurality of trust determination functions corresponding to contexts associated with a reputation key, wherein the contexts include at least different contexts for different types of messaging systems;
calculating, using at least one processor, the reputation score for the context based on the identified trust determination function and the event notification;
associating the reputation score with the reputation key; and
causing one or more electronic messages to be filtered based on the calculated reputation score.

2. The method of claim 1, further comprising:
identifying the context associated with the reputation key; and
assigning a context-specific trust level with the reputation key based on the calculated reputation score and the context, wherein the context-specific trust level is one of a plurality of context-specific trust levels assigned to the reputation key.

3. The method of claim 2, further comprising combining context-specific trust levels to determine an aggregate trust level for the reputation key.

4. The method of claim 1, further comprising generating an alert based on the calculated reputation score and sending the alert to an alert subscriber client.

5. The method of claim 1, wherein the calculating the reputation score comprises calculating the reputation score based on at least one of an attribute or seed data created by the event notification.

6. The method of claim 1, wherein the calculating the reputation score comprises calculating the reputation score based on one or more of: a registration attribute, a spam report event, a this is not spam (TINS) reporting event, an email sending behavior, a send email attribute, an email listing behavior, an email reading behavior, an action event, a whitelist history, a blacklist history, and a mail volume.

7. The method of claim 1, wherein the plurality of trust determination functions provide formulas to calculate reputation scores for the contexts.

8. The method of claim 1, wherein the one or more electronic messages include at least one of electronic mail messages, Short Messaging System (SMS) messages, and Multimedia Messaging System (MMS) messages.

9. The method of claim 1, further comprising filtering the one or more electronic messages by blocking, suspending, or scrambling a password associated with an account associated with the reputation key.

10. The method of claim 1, further comprising:
identifying a type of event based on the at least one event notification; and
training a group focused filter for filtering a certain type of electronic message based on the type of event.

11. A system for filtering electronic messages, comprising:
at least one memory device that stores instructions; and
at least one processor that executes the instructions and is configured to:
receive an event notification;
identify a trust determination function based on a context, the trust determination function comprising a function for calculating a reputation score and being one of a plurality of trust determination functions corresponding to contexts associated with a reputation key, wherein the contexts include at least different contexts for different types of messaging systems;
calculate the reputation score for the context based on the identified trust determination function and the event notification;
associate the reputation score with the reputation key; and
cause one or more electronic messages to be filtered based on the calculated reputation score.

12. The system of claim 11, wherein the at least one processor is further configured to:
identify the context associated with the reputation key; and
assign a context-specific trust level with the reputation key based on the calculated reputation score and the context, wherein the context-specific trust level is one of a plurality of context-specific trust levels assigned to the reputation key.

13. The system of claim 12, wherein the at least one processor is further configured to combine context-specific trust levels to determine an aggregate trust level for the reputation key.

14. The system of claim 11, wherein the at least one processor is further configured to:
generate an alert based on the calculated reputation score; and
send the alert to an alert subscriber client.

15. The system of claim 11, wherein the reputation score is calculated based on at least one of an attribute or seed data created by the event notification.

16. The system of claim 11, wherein the reputation score is calculated based on one or more of: a registration attribute, a spam report event, a this is not spam (TINS) reporting event, an email sending behavior, an email reading behavior, an action event, a whitelist history, a blacklist history, and a mail volume.

17. The system of claim 11, wherein the plurality of trust determination functions provide formulas for calculating reputation scores within the contexts.

18. The system of claim 11, wherein the one or more electronic messages include at least one of electronic mail messages, Short Messaging System (SMS) messages, and Multimedia Messaging System (MMS) messages.

19. The system of claim 11, wherein the at least one processor is further configured to filter the one or more electronic messages by blocking, suspending, or scrambling a password associated with an account associated with the reputation key.

20. The system of claim 11, wherein the at least one processor is further configured to:
identify a type of event based on the at least one event notification; and
train a group focused filter for filtering a certain type of electronic message based on the type of event.

* * * * *